(12) United States Patent
Nuss et al.

(10) Patent No.: US 11,431,467 B2
(45) Date of Patent: Aug. 30, 2022

(54) SYSTEMS AND METHODS FOR TIME SYNCHRONIZATION USING A SINGLE GNSS SATELLITE

(71) Applicant: AIRSPAN NETWORKS INC., Boca Raton, FL (US)

(72) Inventors: Ziv Nuss, Tzur Yigal (IL); Yehezkel Yacoboviz, Givat Zeev (IL)

(73) Assignee: AIRSPAN NETWORKS INC., Boca Raton, FL (US)

( * ) Notice: Subject to any disclaimer, the term of this patent is extended or adjusted under 35 U.S.C. 154(b) by 157 days.

(21) Appl. No.: 16/748,053

(22) Filed: Jan. 21, 2020

(65) Prior Publication Data

US 2021/0226763 A1 Jul. 22, 2021

(51) Int. Cl.
*H03D 3/24* (2006.01)
*H04L 7/00* (2006.01)
*G01S 19/13* (2010.01)
*G01S 19/23* (2010.01)
*G01S 19/00* (2010.01)

(52) U.S. Cl.
CPC .......... *H04L 7/0008* (2013.01); *G01S 19/00* (2013.01); *G01S 19/13* (2013.01); *G01S 19/23* (2013.01); *G01S 19/235* (2013.01); *H04L 7/00* (2013.01); *H04L 7/0012* (2013.01)

(58) Field of Classification Search
CPC ....... H04L 7/0008; H04L 7/00; H04L 7/0012; G01S 19/13; G01S 19/23; G01S 19/00; G01S 19/235; G01S 19/48; G01S 19/24; H04W 72/1215; H04W 48/16

USPC .......... 375/373, 354, 356, 343, 340
See application file for complete search history.

(56) References Cited

U.S. PATENT DOCUMENTS

| | | | | |
|---|---|---|---|---|
| 7,826,459 B2* | 11/2010 | Xhafa | | H04W 72/1215 370/395.5 |
| 2002/0005802 A1* | 1/2002 | Bryant | | G01S 19/24 342/357.64 |
| 2007/0194985 A1* | 8/2007 | Monnerat | | G01S 19/48 342/357.31 |
| 2013/0295962 A1* | 11/2013 | Manroa | | H04W 48/16 455/456.3 |

OTHER PUBLICATIONS

LEA-M8F u-blox M8 time & frequency reference GNSS module Data Sheet. (Apr. 30, 2015). Www.u-Blox.Com. https://www.u-blox.com/sites/default/files/products/documents/LEA-M8F_Datasheet_%28UBX-14001772%29.pdf.

* cited by examiner

*Primary Examiner* — Phuong Phu
(74) *Attorney, Agent, or Firm* — Sughrue Mion, PLLC

(57) ABSTRACT

A system for time synchronization of a network element including a GNSS receiver operative to receive at least one signal from at least one but less than four GNSS satellites, a locator operative to supply a location of a network element including the GNSS receiver to the GNSS receiver and a time synchronization calculator operative to time synchronize the network element with the GNSS satellites based on the at least one signal and the location.

14 Claims, 3 Drawing Sheets

SYSTEMS AND METHODS FOR TIME SYNCHRONIZATION USING A SINGLE GNSS SATELLITE

FIELD OF THE INVENTION

The present invention relates generally to time synchronization and more particularly to systems and methods for time synchronization based on communication with GNSS satellites.

BACKGROUND OF THE INVENTION

Various types of systems and methods for time synchronization based on communication with GNSS satellites are known in the art.

SUMMARY OF THE INVENTION

The present invention seeks to provide novel systems and methods for time synchronization of network elements based on communication with a minimum of a single GNSS satellite.

There is thus provided in accordance with a preferred embodiment of the present invention a system for time synchronization of a network element including a GNSS receiver operative to receive at least one signal from at least one but less than four GNSS satellites, a locator operative to supply a location of a network element including the GNSS receiver to the GNSS receiver and a time synchronization calculator operative to time synchronize the network element with the GNSS satellites based on the at least one signal and the location.

In accordance with a preferred embodiment of the present invention, the GNSS receiver and the GNSS satellites respectively include a GPS receiver and GPS satellites.

Preferably, the GNSS receiver is operative to receive at least one signal from only one GNSS satellite and the location includes three-dimensional coordinates of a location of the network element.

Preferably, the locator includes a management system operative to remotely manage the network element.

Preferably, the system also includes a validation system including a database having stored therein the location of the network element and validation logic for validating the location of the network element, the management system being operative to retrieve the location of the network element from the validation system and remotely supply the location to the GNSS receiver.

Preferably, the management system is operative to periodically retrieve the location from the validation system.

In accordance with one preferred embodiment of the present invention, the location of the network element is additionally manually input to the GNSS receiver.

Preferably, the network element includes an indoor base station.

Additionally or alternatively, the network element includes a Grand Master.

Preferably, the management system includes one of an element management system (EMS) and a network management system (NMS).

There is also provided in accordance with another preferred embodiment of the present invention a method for time synchronizing a network element including remotely supplying a location of a network element to a GNSS receiver included in the network element, receiving, by the GNSS receiver, at least one signal from at least one but less than four GNSS satellites and time synchronizing the network element with the GNSS satellites based on the at least one signal and the location.

In accordance with a preferred embodiment of the present invention, the GNSS receiver and the GNSS satellites respectively include a GPS receiver and GPS satellites.

Preferably, the remotely supplying the location includes remotely supplying the location by a management system managing the network element.

Preferably, the receiving at least one signal from at least one but less than four GNSS satellites includes receiving at least one signal from only one GNSS satellite and the remotely supplying a location of the network element includes remotely supplying three-dimensional coordinates of the network element.

Preferably, the method also includes storing a location of the network element in a database and validating the location of the network element stored in the data base, the management system retrieving the location of the network element from the database and remotely supplying the location to the GNSS receiver.

Preferably, the management system periodically retrieves the location from the validation system.

In accordance with one preferred embodiment of the present invention, the method also includes manually inputting the location of the network element to the GNSS receiver.

Preferably, the network element includes an indoor base station.

Additionally or alternatively, the network element includes a Grand Master.

Preferably, the management system includes one of an element management system (EMS) and a network management system (NMS).

BRIEF DESCRIPTION OF THE DRAWINGS

The present invention will be understood and appreciated more fully based on the following detailed description taken in conjunction with the drawings, in which.

DETAILED DESCRIPTION OF PREFERRED EMBODIMENTS

Figure 1:
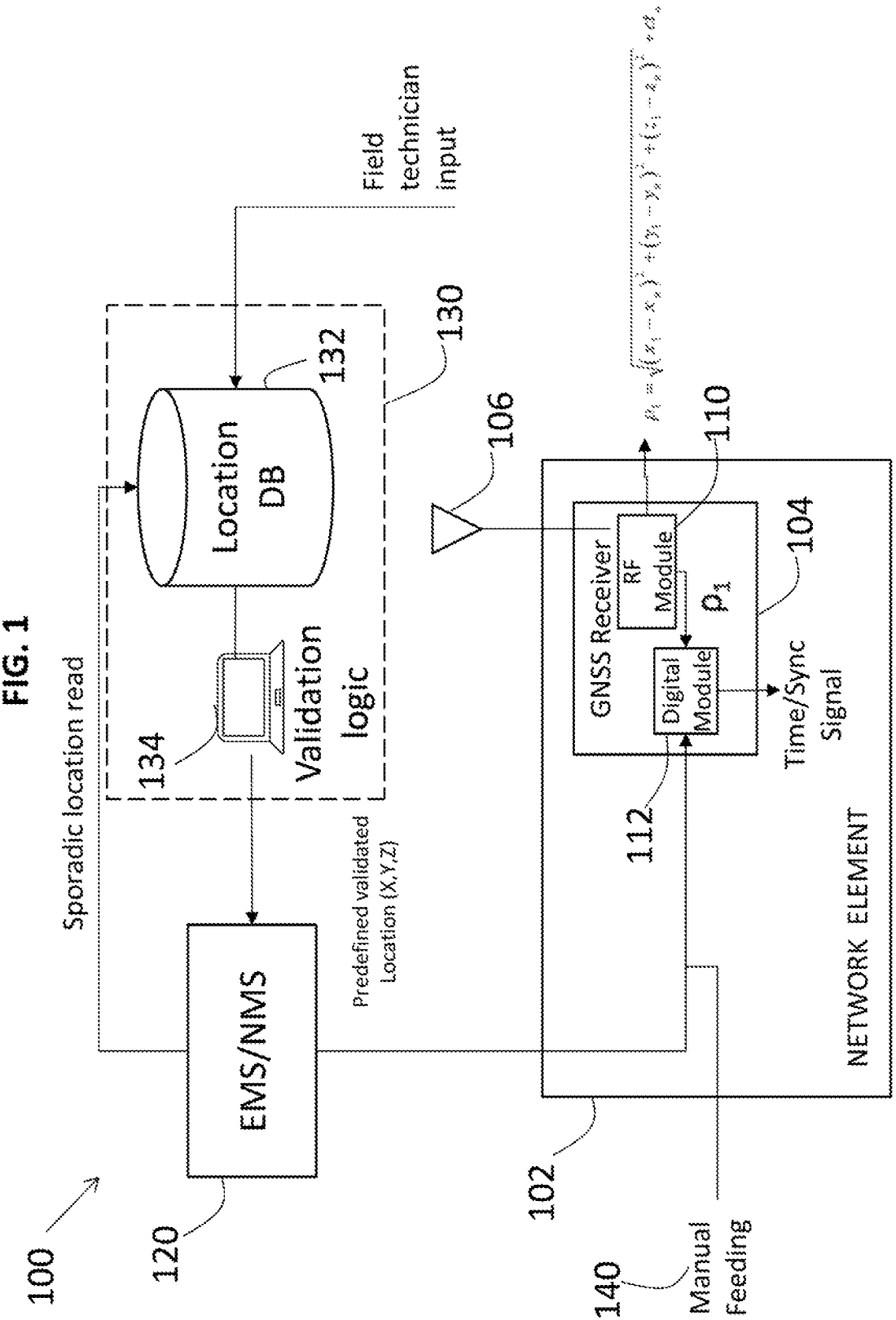
FIG. 1 is a simplified partially pictorial, partially block diagram illustration of a system for time synchronization of a network element, constructed and operative in accordance with a preferred embodiment of the present invention.

Reference is now made to FIG. 1, which is a simplified partially pictorial, partially block diagram illustration of a system for time synchronization of a network element, constructed and operative in accordance with a preferred embodiment of the present invention.

As seen in FIG. 1, there is provided a system 100 including a network element 102. Network element 102 may be any network element benefitting from accurate time synchronization including, by way of example only, a base station or Grand Master. Network element 102 preferably includes a GNSS receiver 104, particularly preferably embodied as a GPS receiver. GPS receiver 104 preferably includes an antenna 106 operative to receive at least one signal from at least one GNSS satellite, particularly preferably embodied as at least one GPS satellite, in order to allow time synchronization of network element 102 with the GPS satellite.

The signal received by antenna 106 is preferably processed by a radio-frequency (RF) module 110 included in GPS receiver 104 and then digitized. The digitized signal is preferably supplied to a digital module 112 included in GPS receiver 104. Digital module 112 preferably functions at least as a time synchronization calculator, preferably operative to time synchronize a clock of the network element with the time of the GNSS satellite clock. Digital module 112 is preferably operative to calculate a time offset between the time of a clock of network element 102 and the time encoded in the signal received from the GNSS satellite and to output a time/synchronization signal based on which the network element 102 may be time synchronized with the GNSS satellite.

It is a particular feature of a preferred embodiment of the present invention that network element 102 may be time synchronized by GPS receiver 104 based on receipt of a signal from only a single GPS satellite. This is in contrast to conventional GNSS time synchronization systems which typically require communication with at least four GNSS satellites in order to achieve time synchronization of the network element. Communication with four GNSS satellites is typically required for time synchronization due to the presence of four unknown parameters in the GPS range p calculation equation:

$$\rho_j = \sqrt{(x_j-x_u)^2+(y_j-y_u)^2+(z_j-z_u)^2}+ct_u \quad (1)$$

wherein $x_u$, $y_u$ and $z_u$ represent the three dimensional coordinates of a particular satellite location, which coordinates are encoded in the signal transmitted by the satellite, and the four unknown parameters are network element j latitude, $x_j$, longitude, $y_j$, height, $z_j$, and receiver time offset $ct_u$.

In accordance with a preferred embodiment of the present invention, the GPS range calculation equation (1) may be solved in order to find the receiver time offset $ct_u$ and thus time synchronize the receiver based on communication with only a single GNSS satellite, rather than four satellites, by supplying the three dimensional coordinates of the location of the network element to the GPS receiver 104, such that only a single unknown remains to be solved for in equation (1).

Preferably, the location of network element 102 is provided to GPS receiver 104 by a locator, here embodied, by way of example, as a remote management system 120. Management system 120 may, by way of example, be a network management system (NMS) or an element management system (EMS). Management system 120 is preferably in operative communication with a validation system 130. Validation system 130 preferably includes a database 132 having stored therein a location of network element 102. The location of the network element may be input to database 132 for example by a field technician responsible for installing network element 102, either prior to or following installation of network element 102. Validation system 130 additionally preferably includes validation logic 134 for validating the network locations stored in database 132.

Management system 120 is preferably operative to periodically retrieve a location of network element 102 managed thereby from database 132. Management system 120 may sporadically read a location from database 132 or read a location from database 132 at regular intervals in time. The location supplied by database 132 may be validated by validation logic 134 before being provided to management system 120. Validation system 130 is thus preferably operative to provide to management system 120 a predefined validated location of network element 102, preferably including the three dimensional coordinate location of network element 102.

In accordance with one preferred embodiment of the present invention, validation logic 134 may be operative to validate whether the location of network element 102 has indeed been correctly identified and/or to ascertain whether network element 102 has been moved from a previously validated location. In this case, validation logic 134 may be operative to read from network element 102 an ID of one or more GNSS satellites in communication therewith at given intervals in time and to find the satellite locations, based on satellite information available from the GNSS almanac. Validation logic 134 may then ascertain whether a network element in the apparent location of network element 102 would be expected to be capable of receiving a signal from a satellite at the location of the satellite in communication with network element 102. In the case that the satellite ID is not compatible with the apparent location of network element 102, validation logic 134 may be operative to indicate an error in the apparent location of network element 102 to management system 120.

Management system 120 is preferably operative to supply the location provided thereto by validation system 130 to GPS receiver 104. Due to the receipt of the three dimensional coordinates of the network element 102 from the management system 120, GPS receiver 104 requires a signal from only a single GPS satellite in order to time synchronize the network element 102 with the GPS satellite.

It is appreciated that the achievement of time synchronization based on communication with only a single GNSS satellite, due to the remote supply of the network element location to the GPS receiver of the network element, is highly advantageous in weak GPS signal environments. Based on this, network elements in weak GPS environments, such as indoor locations, may be time synchronized using only a single satellite, employing standard sensitivity GPS receivers and based on GNSS only without requiring additional positioning systems. Such time synchronization of network elements is mandatory in order to make use of the globally allocated ITU-R frequency bands for LTE/5G mobile technologies.

Furthermore, the supply of the network element location to the GPS receiver 104 of the network element 102 by a locator, such as management system 120, is particularly advantageous, since this allows the network element to be automatically time synchronized immediately upon the installation thereof, based on information provided by the remote locator. In accordance with a preferred embodiment of the present invention, the network element location may thereby be supplied to the GPS receiver without requiring any re-configuration or changes in code to the GPS receiver.

Additionally, changes in the location of the network element 102 in the case that network element 102 is moved may be readily accounted for, by updating location information included in database 132 and without requiring any direct internal re-configuration of the GPS receiver. It is appreciated, however, that the location information provided by the remote management system 120 may be augmented by manual feeding 140 of location information to GPS receiver 104, for example by way of a field technician appropriately configuring internal software code included in GPS receiver 104.

Figure 2:
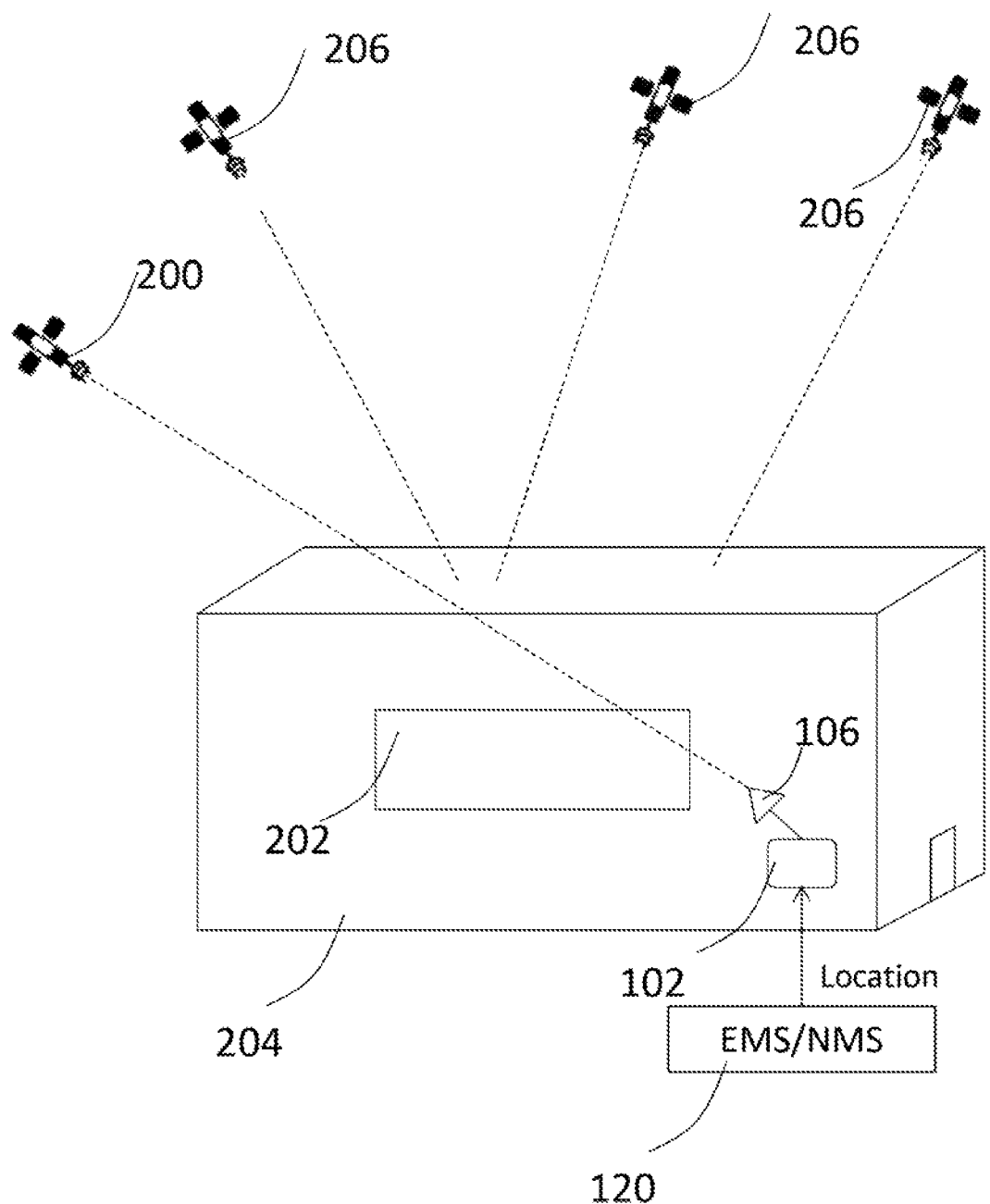
FIG. 2 is a simplified schematic illustration of a network element undergoing time synchronization in accordance with a system of the type shown in FIG. 1.

A highly simplified implementation of the present invention is schematically illustrated in FIG. 2. As seen in FIG. 2, network element 102 is embodied as an indoor base station in operative communication with a locator, here embodied, by way of example, as management system 120. In the scenario shown in FIG. 2, antenna 106 of base station 102 is capable of receiving signals from only a single GNSS satellite 200 through an opening 202 of a building 204 within which base station 102 is located. Signals from additional GNSS satellites 206 are blocked by building 204 and thus are not receivable with satisfactory SNR levels by antenna 106 of base station 102. Notwithstanding the fact that base station 102 is in operative communication with only a single GNSS satellite 200, base station 102 may be time synchronized with GNSS satellite 200 due to the provision thereto of the base station location by management system 120. Base station 102 may thus be time synchronized based on the location fed thereto by remote management system 120 and based on the signal received by single GNSS satellite 200, despite the weak GNSS receiving environment within which base station 102 is located.

It is appreciated that the present invention is not limited to implementation in scenarios in which only a signal from a single GNSS satellite is receivable at a satisfactory SNR. Rather, the present invention may be implemented in scenarios in which signals are receivable from at least one but less than four GNSS satellites. In such cases, location and time information encoded in the signals from the at least one but less than four GNSS satellites is preferably combined by the GNSS receiver 104 with the location information remotely supplied thereto by the management system 120 in order to derive time synchronization.

Figure 3:
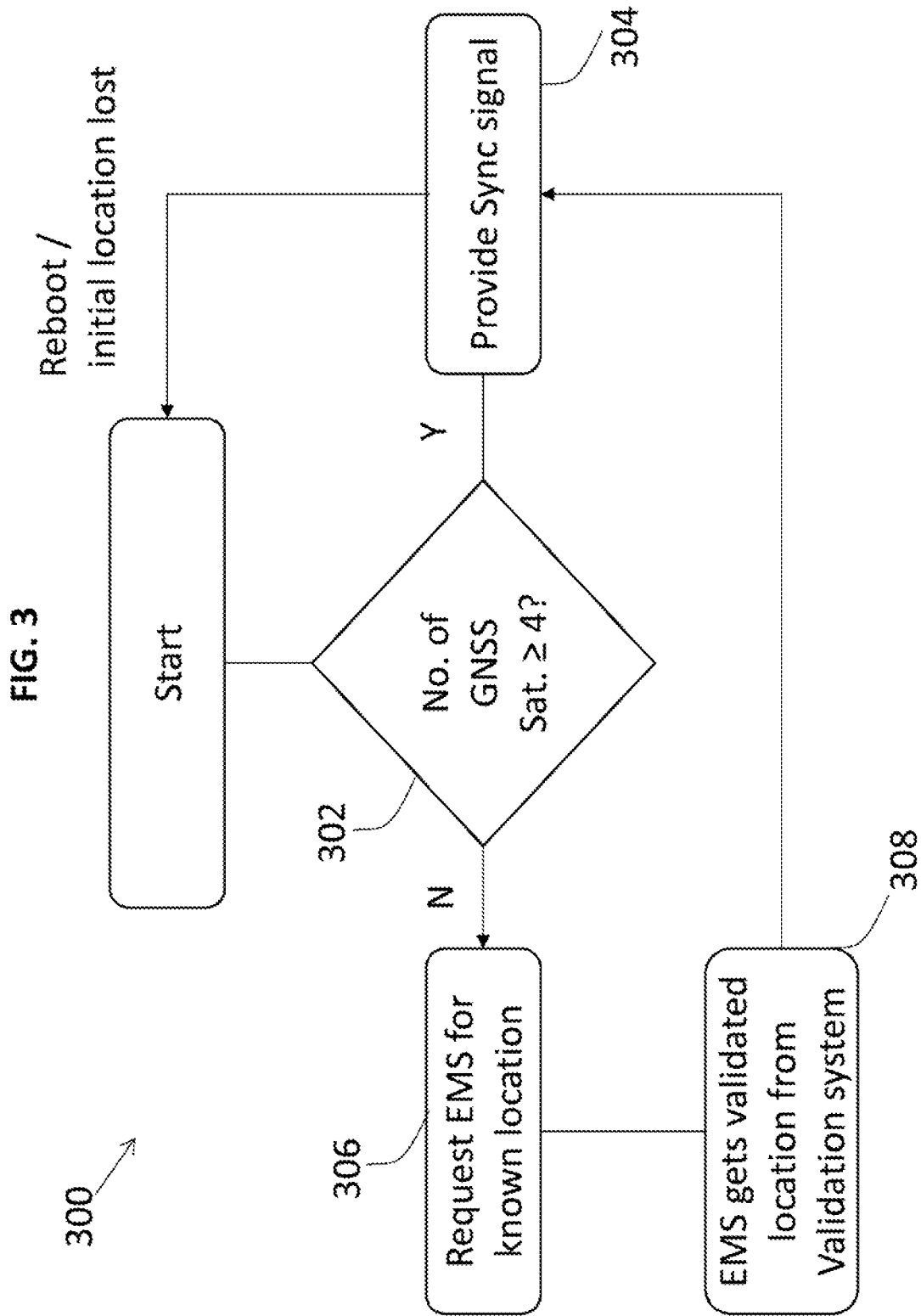
FIG. 3 is a simplified flow chart illustrating steps in the operation of a system of the type shown in FIG. 1.

Reference is now made to FIG. 3, which is a simplified flow chart illustrating steps in the operation of a system of the type shown in FIG. 1.

As seen in FIG. 3, a method 300 for time synchronization of a network element may begin at a first query step 302, whereat the number of GNSS satellites in communication with a network element, such as network element 102 (FIG. 1) is ascertained. In the case that four or more GNSS satellites are found to be in communication with the network element at a sufficient SNR, signals from the four or more GNSS satellites are used to find the time offset of the network element from the time of the GNSS satellites and a time synchronization signal output based thereon, as seen at a second step 304. Preferably, the time synchronization is calculated by a time synchronization calculator included in a GPS receiver of the network element, such as digital module 112 included in GPS receiver 104 (FIG. 1).

In the case that less than four GNSS satellites are found to be in communication with the network element at a sufficient SNR, the location of the network element is requested from a locator, such as management system 120 (FIG. 1), as seen at a third step 306. In response to the request, the management system preferably retrieves a validated location from a validation system, such as validation system 130 (FIG. 1), as seen at a fourth step 308. A time synchronization signal is preferably then output, at second step 304, based on the validated location retrieved at fourth step 308.

It is understood that in the case that the system location is changed or lost or the system is rebooted, method 300 may be carried out again in order to re-perform time synchronization. It is appreciated that some steps within method 300, such as first, second and third steps 302, 304 and 306 may be carried out by computer executable code included in digital module 112 of GNSS receiver 104 of network element 102 (FIG. 1).

It will be appreciated by persons skilled in the art that the present invention is not limited by what has been particularly claimed hereinbelow. Rather, the scope of the invention includes various combinations and subcombinations of the features described hereinabove as well as modifications and variations thereof as would occur to persons skilled in the art upon reading the forgoing description with reference to the drawings and which are not in the prior art.

The invention claimed is:

1. A system for time synchronization of a network element comprising:
   a wireless RF receiver operative to receive at least one signal from at least one but less than four satellites;
   a locator operative to supply a location, including a 3D coordinate, of a network element including said receiver to said receiver, said locator comprising a management system operative to remotely manage said network element;
   a validation system including a database having stored therein said location of said network element and validation logic for validating said location of said network element, said management system being operative to retrieve said location of said network element from said validation system and remotely supply said location to said receiver, and
   a time synchronization calculator operative to time synchronize said network element with said satellites based on said at least one signal received from said at least one but less than four satellites and said location, and not based on signals received from all of said four satellites.

2. A system according to claim 1 wherein said receiver is operative to receive at least one signal from only one satellite and said time synchronization is based on said signal received from said only one satellite and said three-dimensional coordinates of said location of said network element.

3. A system according to claim 1, wherein said management system is operative to periodically retrieve said location from said validation system.

4. A system according to claim 1, wherein said location of said network element is additionally manually input to said receiver.

5. A system according to claim 1 wherein said network element comprises an indoor base station.

6. A system according to claim 1, wherein said network element comprises a wireless RF device.

7. A system according to claim 1, wherein said management system comprises one of an element management system (EMS) and a network management system (NMS).

8. A method for time synchronizing a network element comprising:
   remotely supplying a location of a network element to a wireless RF receiver included in said network element, said remotely supplying said location comprising remotely supplying said location by a management system managing said network element, said location including a 3D coordinate of said network element;
   receiving, by said receiver, at least one signal from at least one but less than four satellites;
   storing said location of said network element in a database and validating said location of said network element stored in said database, said management system retrieving said location of said network element from said database and remotely supplying said location to said receiver, and time synchronizing said network element with said satellites based on said at least one signal and said location and not based on signals received from all of said four satellites.

9. A method according to claim 8, wherein said receiving at least one signal from at least one but less than four satellites comprises receiving at least one signal from only one satellite and said time synchronizing is based on said signal received from said only one satellite and said three-dimensional coordinates of said network element.

10. A method according to claim 8, wherein said management system periodically retrieves said location.

11. A method according to claim 8, and also comprising manually inputting said location of said network element to said receiver.

12. A method according to claim 8 wherein said network element comprises an indoor base station.

13. A method according to claim 8, wherein said network element comprises a wireless RF device.

14. A method according to claim 8, wherein said management system comprises one of an element management system (EMS) and a network management system (NMS).

* * * * *